United States Patent
Hutchison et al.

(10) Patent No.: US 10,887,202 B2
(45) Date of Patent: *Jan. 5, 2021

(54) PRE-STARTING SERVICES BASED ON TRAVERSAL OF A DIRECTED GRAPH DURING EXECUTION OF AN APPLICATION

(71) Applicant: International Business Machines Corporation, Armonk, NY (US)

(72) Inventors: Gordon Hutchison, Eastleigh (GB); Adam Pilkington, Eastleigh (GB); Graham C. Charters, Hampshire (GB); Tim Mitchell, Chandlers Ford (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/679,667

(22) Filed: Nov. 11, 2019

(65) Prior Publication Data

US 2020/0076712 A1 Mar. 5, 2020

Related U.S. Application Data

(63) Continuation of application No. 15/822,315, filed on Nov. 27, 2017, now Pat. No. 10,547,522.

(51) Int. Cl.
*H04L 12/26* (2006.01)
*H04L 12/24* (2006.01)
(Continued)

(52) U.S. Cl.
CPC .......... *H04L 43/045* (2013.01); *H04L 41/069* (2013.01); *H04L 41/0823* (2013.01);
(Continued)

(58) Field of Classification Search
CPC ... H04L 29/08135; H04L 41/0681–069; H04L 41/0823–0836;
(Continued)

(56) References Cited

U.S. PATENT DOCUMENTS 9,412,066 B1 8/2016 Satish
9,613,312 B2 4/2017 Khaneghah
(Continued)

OTHER PUBLICATIONS

Jonas et al., Occupy the Cloud: Distributed Computing for the 99%, Jun. 17, 2017, 8 pages.
(Continued)

*Primary Examiner* — Brendan Y Higa
(74) *Attorney, Agent, or Firm* — Schmeiser, Olsen & Watts, LLP; Christopher Pignato (57) ABSTRACT

A method and system for which a service call is referred to as an event and processing the service call is referred to as an action. Traversal of a directed graph is monitored for an application during execution of the application. Traversal probabilities for events in the directed graph which may still occur during the execution of the application are continually revised. Decision logic is applied during the execution of the application to decide whether to pre-start one service in the directed graph that may still be called prior to an event in the directed graph calling the one service. The one service decided upon by the decision logic is pre-started.

20 Claims, 5 Drawing Sheets

(51) Int. Cl.
   *H04L 29/08* (2006.01)
   *G06F 9/38* (2018.01)
(52) U.S. Cl.
   CPC ...... *H04L 41/5016* (2013.01); *H04L 41/5048* (2013.01); *H04L 41/5051* (2013.01); *H04L 67/10* (2013.01); *G06F 9/3802* (2013.01); *G06F 9/3842* (2013.01); *G06F 9/3844* (2013.01); *H04L 41/5096* (2013.01)
(58) Field of Classification Search
   CPC ... H04L 41/5012–5016; H04L 41/5041–5051; H04L 41/5096; H04L 43/045–067; H04L 67/10; G06F 9/38–3802; G06F 9/3842–3848
   See application file for complete search history.

(56) References Cited

U.S. PATENT DOCUMENTS

| | | |
|---|---|---|
| 9,811,363 B1 | 11/2017 | Wagner |
| 9,811,434 B1 | 11/2017 | Wagner |
| 9,830,175 B1 | 11/2017 | Wagner |
| 10,261,938 B1 | 4/2019 | Jenkins et al. |
| 10,365,985 B2 | 7/2019 | Wagner |
| 2001/0044850 A1 | 11/2001 | Raz et al. |
| 2003/0220984 A1 | 11/2003 | Jones et al. |
| 2009/0089115 A1 | 4/2009 | Murthy |
| 2009/0328046 A1 | 12/2009 | Proctor et al. |
| 2010/0049678 A1 | 2/2010 | Huang et al. |
| 2013/0205286 A1 | 8/2013 | Barraclough et al. |
| 2014/0222946 A1 | 8/2014 | Lipstone et al. |
| 2016/0156732 A1 | 6/2016 | Chen et al. |
| 2017/0024717 A1 | 1/2017 | Istrati |
| 2017/0083337 A1 | 3/2017 | Burger |
| 2017/0116764 A1 | 4/2017 | Balmin et al. |
| 2018/0173755 A1 | 6/2018 | Xia et al. |
| 2019/0026697 A1 | 1/2019 | Burton et al. |
| 2019/0166023 A1 | 5/2019 | Hutchison et al. |

OTHER PUBLICATIONS

Mark Boyd, Amazon Debuts Flourish, a Runtime Application Model for Serverless Computing, May 26, 2016, Retrieved from Internet: URL: https://thenewstack.io/amazon-debuts-flourish-runtime-application-model-serverless-computing/, 7 pages.

Josef Spillner, SNAFU: Function-as-a-Service (FAAS) Runtime Design and Implementation, Mar. 23, 2017, Retrieved from Internet: URL: https://arxiv.org/pdf/1703.07562.pdf, 15 pages.

Baldini, et al., Serverless Computing: Current Trends and Open Problems, Jun. 10, 2017, Retrieved from internet: URL: http://arxiv.org/pdf/1706-03178.pdf, 20 pages.

Notice of Allowance (dated Sep. 18, 2019) for U.S. Appl. No. 15/822,315, filed Nov. 27, 2017.

PRE-STARTING SERVICES BASED ON TRAVERSAL OF A DIRECTED GRAPH DURING EXECUTION OF AN APPLICATION

This application is a continuation application claiming priority to Ser. No. 15/822,315, filed Nov. 27, 2017.

TECHNICAL FIELD

The present invention relates to predictive management of services, and in particular, to microservices in serverless computing environment, in order to improve application flow.

BACKGROUND

Serverless computing is a relatively new form of service provision for running applications and is growing in popularity. Serverless computing is a service that is offered by cloud computing providers in which the services are provided on demand, rather than continuously in an always-ready state in case the services are needed. In a serverless computing environment, the service provider runs an application on a server only for as long as the user requires work to be done by the application. Unlike a classic cloud service provision, no long-running server is left executing the application in the cloud server environment.

One serverless cloud provider is International Business Machines Corporation (IBM®) which offers a service called OpenWhisk®.

The provider starts up a service, from no persistent state, when an 'event' occurs that is configured to trigger the service to run in order to handle the event.

Serverless computing models often employ a microservice framework. A microservice is a small, modular service that can be joined and connected with other small, modular services to create a technology stack. Instead of deploying one large application, a number of smaller modular applications are used, which can be called and also call each other and/or be controlled via an application programming interface (API), in particular a REST-ful API, where REST stands for Representational State Transfer. One advantage of a microservice approach is that the different modules can be written in different languages.

Although large numbers of enterprise application programmers are familiar with the Java® programming environment, and in particular with the Java platform enterprise edition (JEE), JEE is not intrinsically well suited to a serverless computing environment, because the Java virtual machine (JVM) and JEE services are optimized for long running applications. JEE is a platform of modular components that each run on an application server. Specifically, there is a time penalty when an application is started, so frequently starting and stopping applications, as is needed in a serverless computing environment, is not efficient, which has led to a relatively low adoption of Java and JEE for serverless computing environments, such as the WebSphere® Application Server (WAS) offered by International Business Machines Corporation (IBM).

SUMMARY

Embodiments of the present invention provide a method, and associated computer system and computer program product, for which a service call is referred to as an event and processing the service call is referred to as an action. One or more processors of the computer system generate a directed graph for an application. The directed graph has vertices representing services and edges representing events. The directed graph provides a map of process flow of the application. The one or more processors associate a traversal probability with each event in the directed graph. The one or more processors monitor traversal of the directed graph during an execution of the application and continually revise traversal probabilities for those events in the directed graph which may still occur during the execution of the application. The one or more processors apply decision logic during the execution of the application to decide whether to pre-start one service in the directed graph that may still be called prior to an event in the directed graph calling the one service. The one or more processors pre-start the one service decided upon by the decision logic.

DETAILED DESCRIPTION

In the following detailed description, for purposes of explanation and not limitation, specific details are set forth in order to provide a better understanding of the present disclosure. It will be apparent to one skilled in the art that the present disclosure may be practiced in other embodiments that depart from these specific details.

A directed graph is a set of vertices, pairs of which are interconnected by directed edges. For the present invention, a vertex is a service, or more particularly a node at which a (micro)service is provided, and a directed edge is a process flow branch representing a service call or trigger.

The directed edges are annotated with traversal probabilities and optionally also traversal time information. The vertexes (i.e., vertices) may be also annotated with pre-start times, the pre-start time being the recommended lead time for pre-starting a service so that the service is ready if and when a predicted trigger occurs. The structure of the directed graph and/or the data content associated with the directed graph, namely one or more of the traversal probabilities and timing information of the directed edges and vertices, can be continually updated as the services are being used, so the directed graph remains optimized to the current situation. Optimization of the timing information can take account of real-time data feeds of external events and of whether the previous interventions were initiated too early (i.e., the event occurred later than predicted, so the application was idle initially after start-up), too late (i.e., the event occurred sooner than predicted, so the application had not finished its start cycle) or were unnecessary (i.e., the predicted service was not called, so the start-up was not needed).

The pre-start strategy in some embodiments may be provided as a control framework which hierarchically sits above the microservices.

The decision logic may advantageously incorporate learning based on monitoring and analyzing process flow each time the application is run; i.e., each time the directed graph is traversed.

The method may comprise: additionally applying the decision logic to decide whether to close services that are currently running, based on whether the services may still be called.

The decision logic in certain embodiments takes account of the traversal probabilities.

The method may comprise: determining a required pre-start time for each service, which is an amount of time taken by the service from receiving a service call to becoming ready to process an action; and starting a service which the decision logic has decided to pre-start at a time that is ahead of the service's predicted call time by a time interval based on the required pre-start time. Pre-start markers which store the required pre-start times may be associated with vertices lying at least one edge upstream of the services to be pre-started, and/or the required pre-start time for each service may be continually revised based on monitoring processing times for actions on each service.

The method may comprise: determining a pre-start payoff time for each service which is a time difference between a processing time for an action when the service is already running and available at the time the event occurs, and a processing time for an action when the service is not running and is first started by the event, wherein the decision logic decides on whether to pre-start a service taking account of the pre-start payoff time for the service. Optionally, the pre-start payoff time can be continually revised for each service based on monitoring at least one of required start-up times for each service and processing times for actions on each service.

Another potentially beneficial measure to undertake in certain embodiments is to associate an expected traversal time with each event, which can then be used to decide during execution if a particular edge is "dead", where "dead" means will no longer be traversed. An edge is deemed to be dead during execution of an application if that edge is: either not traversed by an event once an amount of time has elapsed after process flow has arrived at the vertex located at the edge's upstream end, wherein the an amount of time that has elapsed is significantly greater than the expected traversal time; or an alternative edge is traversed emanating from the vertex; i.e., the process flow has taken a different branch. In response to deeming an edge to be dead, the traversal probabilities for edges lying downstream of the vertex at the upstream end of the dead edge can be revised to take account of non-traversal of the dead edge. The annotations on the directed graph are thus updated during execution to improve the decision making on pre-starts by the decision logic.

According to an aspect of the invention, there is provided a learning engine to implement the inventive method. The learning engine maps the flow between connected services. The learning engine is configured to generate a directed graph to map the process flow.

Embodiments of the invention are applicable not only to improving the execution of Java services, but also other service environments. For example, other embodiments can be applied to docker containers, which are a common packaging tool for cloud based services. Docker containers can contain a whole stack from the operating system service (e.g., Windows® or Linux®) and thus take a significant amount of time to load from disk storage and start-up prior to being able to execute an action requested by a user on the service. The proposed approach can be used to partly or wholly hide this latency (i.e., the significant amount of time to load) using the above-described learning engine.

The present invention may comprise, at a technical level, a microservice optimization, rather than a serverless computing optimization, since the predictive start-up of services is of main benefit when larger numbers of services are being called in shorter periods of time, which is a characteristic of microservices owing to the small size and modular property of microservices. Since serverless computing environments are generally implemented with microservices, the benefit therefore carries across to serverless computing. However, it is also possible that a microservice approach is used in other fields where microservices are employed; i.e., not in serverless computing, and some embodiments of the present invention will therefore lie outside the field of serverless computing.

The methods of present invention include learning the pathways through an application comprising event-driven services to predict which services are likely to be needed by the application and when. The learnt predictions allow services that may be about to be called to be started early (i.e. pre-started) a short time before occurrence of the event that triggers an action on the service. The aim of the pre-start is to ensure that when a trigger occurs calling a particular service, that service is already up and running, or at least part way through a start cycle of the service, thereby wholly or partly avoiding start delays; e.g., when using JEE to implement a serverless computing environment. The time spent booting the Java JEE environment for a particular service can thus be at least partially hidden from the end-to-end application flow, which makes use of JEE more attractive for a serverless computing model, allowing the user and programmers to use the more familiar Java enterprise programming environment. The approach has been developed specifically with JEE in mind, but can be applied to any other programming environment.

Although the present invention includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
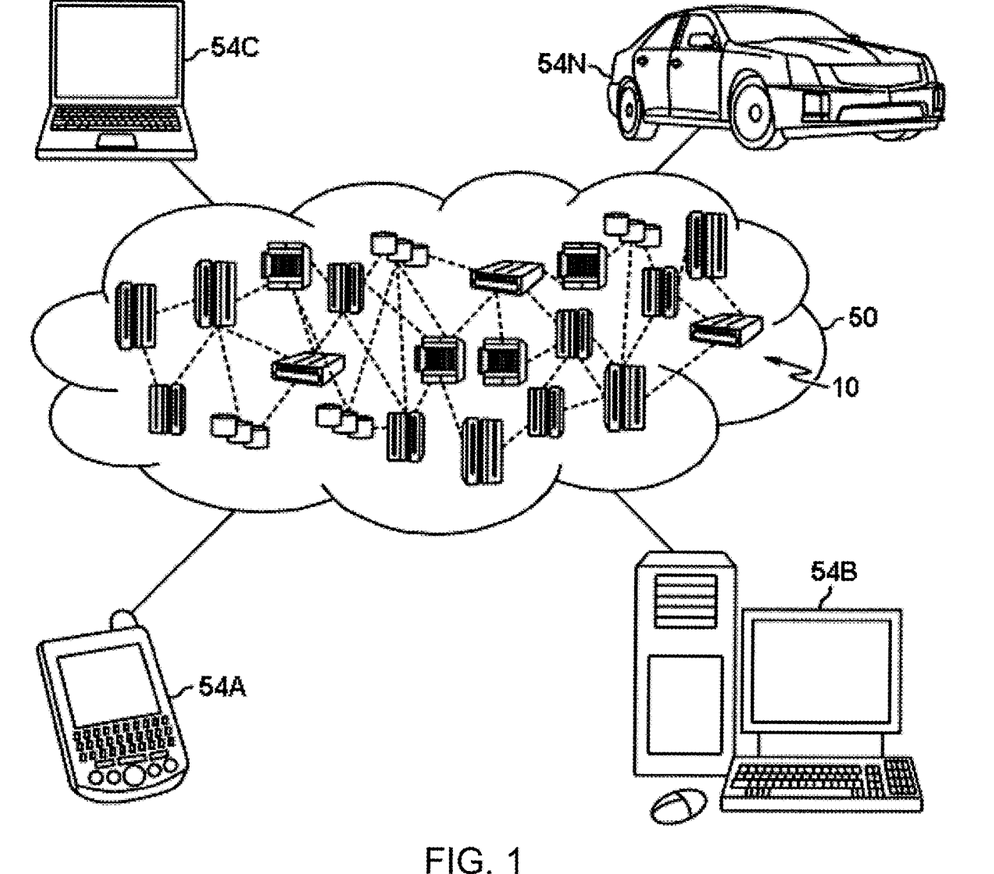
FIG. 1 depicts a cloud computing environment according to an embodiment of the present invention.

FIG. 1 depicts a cloud computing environment 50 according to an embodiment of the present invention.

As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
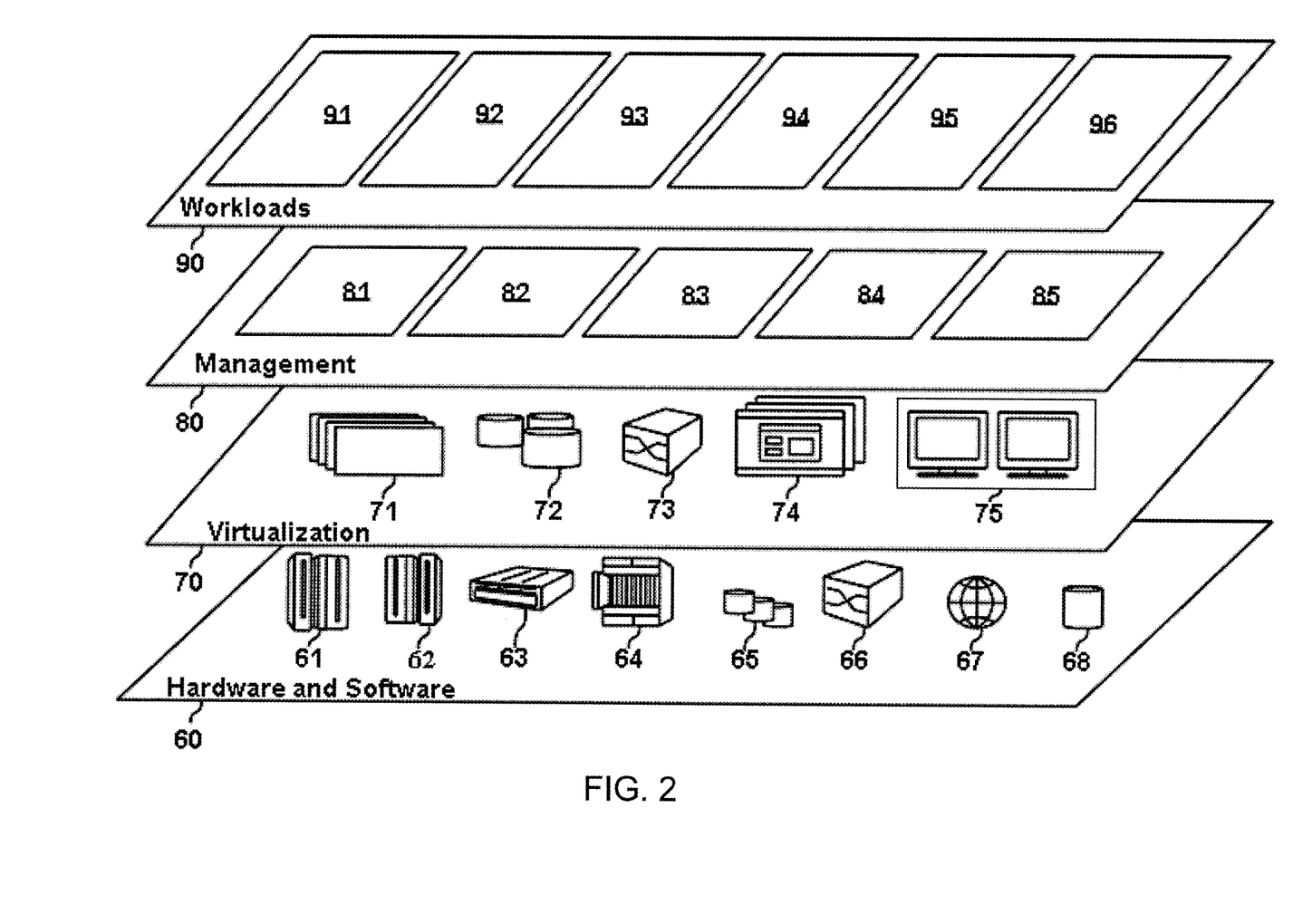
FIG. 2 depicts abstraction model layers according to an embodiment of the present invention.

FIG. 2 depicts abstraction model layers according to an embodiment of the present invention. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management and Service Level Agreement (SLA) planning and fulfillment 84 provides cloud computing resource allocation and management such that required service levels are met. Service Level Agreement (SLA) planning and pre-arrangement for, and procurement of, cloud computing resources for which a future requirement is anticipated in accordance with an SLA respectively. Learning engine 85 provides directed graph generation and a decision-making logical framework according to embodiments of the disclosure.

Workloads layer 90 provides examples of functionality for which the cloud computing environment may be utilized. Examples of workloads and functions which may be provided from this layer include: mapping and navigation 91; software lifecycle management 92; virtual classroom education delivery 93; data analytics processing 94; transaction processing 95; and software development cycle management 96.

Figure 3:
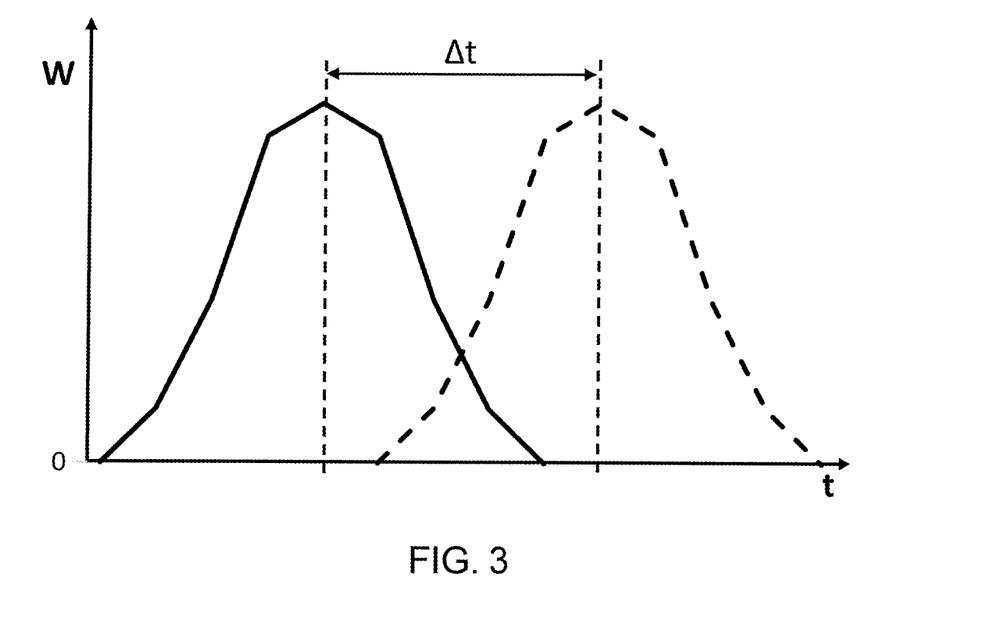
FIG. 3 is a diagrammatic representation of work done by a server over time to start-up a microservice and to implement the microservice, in accordance with embodiments of the present invention.

FIG. 3 is a diagrammatic representation of work, W, done by a server (ordinate) over time, t, (abscissa) to start-up a microservice (solid line) and to implement the microservice (dashed line), in accordance with embodiments of the present invention. As illustrated schematically, the server does work to start the service which has some arbitrary functional evolution over time from the start-up trigger until the start-up is complete. Similarly, the implementation of the service also has some arbitrary functional evolution over time from the beginning of the microservice execution to the end. The maxima of the start-up and implementation load functions have some temporal offset, Δt, with the start-up occurring generally earlier and the implementation generally occurring later, but with some overlap to reflect that implementation may commence before all aspects of the start-up are complete, for example after some initial start-up tasks are done. The combined server load is the summation of the work W of the start-up and implementation phases. Start-up work may be measured in one of several ways depending on the particular system environment. One measure of start-up work is processor work, such as CPU utilization. Another measure of start-up work is work retrieving data from latent storage (e.g., RAM population from ROM over a bus or local server population from a remote server in a network).

Embodiments of the present invention analyzes process flow to predict when a service is likely to be needed and then starting that service ahead of the time the service is predicted to be needed. Pre-emptively starting or pre-starting a service pertains to pre-starting the service at a moment in time which is ahead of the predicted start time by a time interval which is an optimum pre-start time interval, which results in the service being available immediately when called by an event.

An embodiment of the present invention is next described.

An event-action execution system (e.g., Lambda, OpenWhisk, Google-Cloud-Functions, Microsoft-Functions) will observe and collect information of the type summarized below, where the notation 'function_X' can be read to mean 'event occurs that triggers function_X':

function_A calls function_B;
function_C returns WebPage to IP address/session NNN;
incoming event from address/session NNN triggers function_D.

Over a period of time these statistics are used as directed edges (or 'edges' for short) that make up a weighted directed graph. The directed graph has vertices representing services and edges representing events. Each edge also has a time information that is the amount of time between the service at the upstream end of the edge being run and the subsequent event that triggers the service at the downstream end of the edge to be run. This amount of time is thus a traversal time for the edge, which is referred to as a 'call-out fuse time' in the following. The call-out fuse time may be estimated, or determined empirically by monitoring the process flow, so that as an application is run more and more times, an accurate average value of the call-out fuse time can be arrived at.

Figure 4:
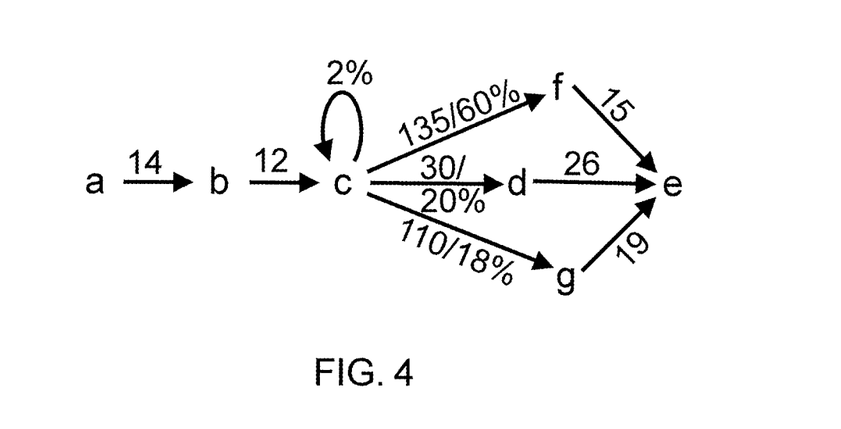
FIG. 4 shows an example branch diagram of predicted service-to-service flows, in accordance with embodiments of the present invention.

FIG. 4 shows an example branch diagram of predicted service-to-service flows following the preceding approach, in accordance with embodiments of the present invention. Here, event_a is always followed by event_b and then event_c. Event_c is followed by either event_f, event_d or event_g, where 'f' occurs 60% of the time, 'd' occurs 20% of the time and 'g' occurs 18% of the time, or with no next event, which is observed the remaining 2% of the time. Events 'f', 'd' and 'g' are then followed by event_e; i.e., the process flow coalesces again into a single strand. The numbers in FIG. 4 labelled alongside the associated edges are times in milliseconds and each such time represents the average time between the respective events occurring between successive vertices; i.e. the above-mentioned call-out fuse times. The percentage values in FIG. 4 are those just mentioned. From FIG. 4, one can see that when event_a is initiated and the flow ultimately proceeds to event_f (which in this example has a 60% likelihood as stated above) event_f will be initiated on average of 161 microseconds after initiation of event_a, which is the sum of the call-out fuse times in the process flow: 14+12+135.

A first way of optimizing a node-specific pre-start time is to obtain an average for the start-up time required by a node, which can be implemented as follows. Each time one of the graph's nodes is traversed, the time interval between starting the service and service processing is noted. From these data an average of the time interval can be calculated, which may be rolling average over a recent time span, or a lifetime average, or some other average. This average can then be used as the optimum pre-start time interval defined above when discussing FIG. 3. Each node therefore has an optimum pre-start time interval associated with the node, representing the start-up delay for the service associated with that node. To increase the quality of the data being collected for computing the optimum pre-start time interval, the service may, during a learning phase, be deliberately started too early, where too early means starting well ahead of the current value of the optimum time pre-start time interval, or well ahead of a reasonable estimate the optimum time pre-start time interval in the case there is no historical data. By starting too early, the evolution of the work associated with the start-up of the microservice (solid line of FIG. 3) and the evolution of the work associated with implementing the microservice (dashed line of FIG. 3) are more readily separable. By starting too early and thereby giving extra lead time, it is more readily observable how a server's CPU utilization, or other start-up work measure, decreases in the course of start-up before the event being delivered causes an increase in CPU utilization. The system may be designed to adopt over-early pre-starts during a learning phase, wherein the learning phase is entered initially and then optionally re-entered every so often to improve and update the node-specific average start-up delays.

A second way of optimizing a node-specific pre-start time is to measure the average processing time between a node receiving an event and completing the associated action triggered by the event (e.g., by outputting a result), which can be done each time one of the graph's nodes is traversed. For any given node, the pre-start time interval is varied in a control loop so as to minimize the processing time taken, or more accurately to find the minimum pre-start time delay required to arrive at the minimum overall processing time, given that there will be a plateauing of the processing time once the pre-start is early enough to ensure that an event can be actioned immediately on receipt. In this way, the optimum pre-start time interval is arrived at indirectly.

The two previously described approaches for determining an optimum pre-start time interval, namely measuring the time from start-up initiating to drop-off in start-up work, or measuring the plateauing of processing time, are just two concrete examples. The underlying aim of both, and other alternatives that could be envisaged by the skilled person, is to calculate how much lead time is useful when pre-emptively starting services, and any other approach with the same result could be used as an alternative.

Another significant parameter is 'pre-start payoff time', which is the time difference between processing time when there is no pre-start and processing time with a pre-start time interval that is equal to or greater than the optimum pre-start time interval. Thus, a measure of the processing time is saved by pre-starting the service. Pre-start payoff time will again be a node-specific value. The pre-start payoff time is thus a measure of how worthwhile it is to adopt a pre-start strategy for a particular node, which can be balanced in practice against other competing requirements such as the computational cost and additional complexity of adopting a pre-start strategy, general availibility of resources, and the relative benefits of pre-starting one service as compared to pre-starting another service. This balance results in a breakeven in each situation which is the point where a pre-start strategy gives zero benefit. If desired, breakeven could be determined not only based on pre-start payoff times, but also to take account of computational overhead and delays of running a pre-start strategy or other external factors, which involves data collection and decision making on pre-start timings, as described above. The present invention refers to a delay of running a pre-start strategy, since the learning phases described above will require the pre-start time interval sometimes being chosen to be longer than the optimum. With this variant, breakeven for adopting a pre-start strategy would then be when the sum of the pre-start payoff times for the services is greater than the sum of the optimum pre-start time intervals of the services plus some threshold taking account of the overhead of running the pre-start strategy. Awareness of a pre-start payoff time, and the probability that the service will be used in the next period of time, therefore allows selective pre-starting of services with empirical reasoning conditional on there being a benefit.

The directed graph that maps the process flow is useful not only for pre-starting services, but also for making decisions on whether to close services that are running. A service may be closed down (or flagged to indicate the service can be closed if the service's resources are needed for another task) when the service is not likely to be needed any more or kept running, if the probability of that service being called again within a certain time means there is net benefit in keeping the service running rather than shutting the service down and then possibly having to restart the service a short time later. The decision making in all these cases is made by continually updating probabilities downstream as the navigation of the process flow develops; i.e., during application execution. The updating can take account not only of which upstream branches the flow has already followed, but also which downstream branches will likely not be followed. These non-adopted branches which will likely not be followed, which are referred to as dead branches, can be identified with reference to the call-out fuse time. Namely, an edge of the flow that is not traversed within some multiple of the call-out fuse time (e.g. 150%, 200% or 300%), can be interpreted as indicating that this branch of the process flow associated with the edge will not be followed. This branch of the process flow and all branches downstream of this branch can then be deemed to be 'dead'; i.e. a dead branch. Downstream probabilities for this flow from the vertex located at the upstream end of the dead edge can be adjusted. For example, if a service on a downstream node can only be called via the non-traversed, dead edge, then that service will now have a zero probability of being invoked according to the graph, so if that service has been pre-started, the service can be closed down again. Of course an edge will also become dead if an alternative edge is traversed emanating from the same vertex. More generally, the update of the downstream probabilities will result in upward or downward revisions in the probabilities of the different services being invoked according to the graph, so decision logic can be applied to decide whether existing services that are running, but not currently processing a live service request, should be shut down or kept running. When it is decided that there is no longer a net benefit in keeping a particular running service resident any longer in view of the updated probabilities, the service can be closed down; i.e. removed, or at least added to a pool of server instances that may be recycled or repurposed to run other services if needed. The above-described management of running services may be applied to all running services, or to a subset of running services, such as those running services which have been pre-started and are still in their start-up phase; e.g., those running services for which the current time minus the pre-start time is less than the average start-up time for that service, or those running services that have not yet received a live service request. In particular, the use of the call-out fuse time to identify downstream branches that will not be followed, allows recently pre-started services that may still be in their start-up phase to be closed down.

Because the probability of a pre-started service being required to process a live service request within a period of time is known and tracked, the server resource slots currently occupied by pre-started services can be selected for recycling according to actual incoming service needs in a manner that is optimized so that the most probably required services that are already running, e.g. in their pre-start phase, are kept running as long as possible until that service is utilized, or the server resources the pre-started services are occupying are needed for some other activity, or a probability update deems that the service should now be closed.

Figure 5:
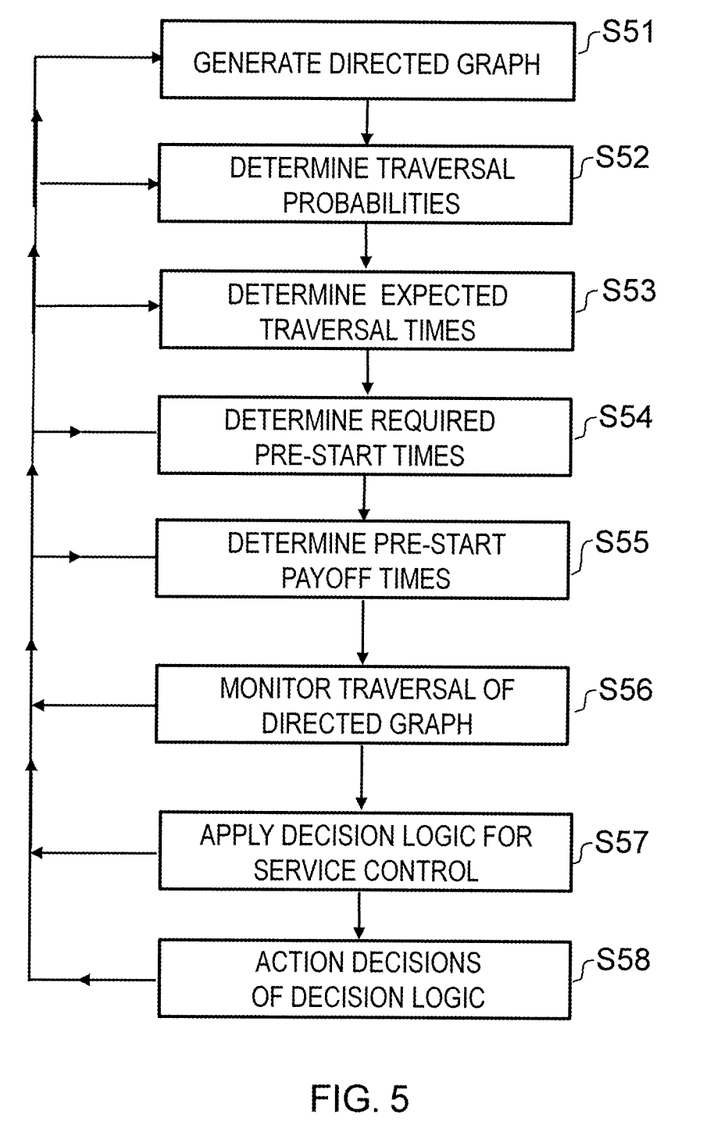
FIG. 5 is a flow diagram showing an embodiment of the present invention which manages service states for an application.

Referring back to FIG. 2, and in particular the learning engine 85 of the management layer 80, a further description of how to implement the method described with reference principally to FIG. 4 and FIG. 5 is next provided. The learning engine will be typically provided as part of the management software and would have elements that provide the following functionalities: (i) observing events; (ii) storing data of the events, and doing its calculations with the data; and (iii) initiating service pre-starts. These three elements can be thought of as the input, processing, and output, and could be packaged in a product as follows:

Observing Events: The functions for observing the service-to-service flows would be done as an "observer" in the software that routes service-to-service calls. Depending on the specific embodiment, this observer could either be as part of a "sidecar"-type element (e.g., Lyft's "Envoy" sidecar) or as part of the implementation of the "container" software that runs the user code and receives outgoing requests.

Processing: The learning/calculating engine can be conveniently hosted in any part of the system middleware and could be packaged in a form similar to an application, but is more likely to be an additional module of the infrastructure code.

Pre-start initiation: The elements for initiating service pre-starts would most likely be an additional interface and code in the software that is used by the system to load and start applications in response to a user request, but which will receive the equivalent of a "null" request for the specific call parameters.

One example of implementing the above-described method is now described. An application that uses a number of services is considered, where the application may be directed by a user's control of a browser, for example.

For each node in the graph, the in-bound edges are traversed transitively until the sum of the call-out fuse times on edges traversed is greater than or equal to the pre-start payoff time on the node in question. The node arrived at is labelled with a 'pre-start marker' for each follow-on node. Each pre-start marker is associated with the combined probability that the call sequence will continue to the follow-on node in question from the currently executing node. This probability is calculated by multiplying the probabilities of each edge on the pre-start path from the current node to the node receiving the pre-start marker.

For each pre-started service, the system tracks the probability of that service being needed, where this probability is updated continually as upstream services take paths of execution that are observed (or not) by the system.

The graph is continually updated with each data point and thus adapts to 'learn' (and continually re-learn) the service paths that a particular application follows, and the benefits (or not) of pre-starting services that are included in the application before those services are actually called by the application.

In a manner similar to a service being pre-started, if a service is deemed to be re-usable by the service's owner, then, instead of automatically shutting down the service, decision logic based on the directed graph is applied to make a decision on whether to shut down the service or to keep the service running. Namely, if the service is marked by the user as 'reusable' for a subsequent request, then, if a pre-start of the service is currently, or in the very near future, deemed useful, a decision can be made to leave the service in operation to await the arrival of the next request for the service to handle, the effect of which is to insert a wait interval prior to shutting down a service, if the service is deemed likely to be given a processing task in the near future according to the directed graph. A kind of hysteresis concept is thus introduced into the decision making on closing down running services, since the optimum state of a service (running or not running) at any particular moment in time is dependent on its history; i.e., whether the service is already running or not running.

Referring to the above discussion, it is apparent that the effect of the approach of the present invention is to blur the distinction between a serverless computing platform and a traditional server-based computing platform in a manner that is more useful than the models commonly available today.

FIG. 5 is a flow diagram showing an embodiment of the present invention which manages service states for an application. This functionality of managing service states for an application may be provided by a service management program. The application performs multiple calls to microservices from among a library or other set of microservices that are made available to the application. As mentioned above, a service call is referred to as an event and processing a service call is referred to as an action.

In Step S51, the service management program generates a directed graph for the application. The directed graph has vertices representing services and edges representing events, thereby providing a map of process flow of the application. An example simplified directed graph is shown in FIG. 3 as described above. Initialization may be to a state with no node information, in which case, when user work first arrives, a triggering occurs of the first ever "node" to run, and then from the nodes that the user work makes use of (and further incoming work) the directed graph is constructed. Typically, the directed graph will be built by observation of the running system. Because the directed graph will be built by observation of the running system, from the very first time a candidate downstream node is known of, the time from the start of the calling node to the observation of the call to the subsequent called node is known. This first value is used to update a running average using the same means as subsequently observed service-to-service calls.

In Step S52, the service management program determines a traversal probability for each event, which may be done initially from a blank sheet; i.e., no prior or assumed information on the probability values, or alternatively, on values from a previous state of the system that occurred the last time the server was in use. Another alternative would be to analyze the application before the application is executed to obtain some initial values.

In any case, as the application is executed, these traversal probabilities can be continually revised based on a monitoring of the application. The traversal probability revisions may be limited only to those events which are still possible to call. For example, referring to FIG. 4, if the process flow is already at service c, the traversal probability revisions could have been already excluded for the events connecting services a-to-b and b-to-c, since the directed graph shows these traversal probability revisions will no longer occur in the present instance of the application. This continual revision of the traversal probabilities occurs in Step S52, and also the other parameters related to pre-start timings occur in Step S53 and S54, as indicated in the flow diagram by the return loops. Here it is noted that the directed graph may also be included in this continual revision cycle, so that the structure of the directed graph may also evolve over time, not just the timings and probabilities associated with the structure, as indicated by the loop back to Step S51. The traversal probabilities for edges that were downstream possibilities of previous current nodes, but which were not selected within the time expected or which were not chosen from one of a number of alternatives in the current path taken, together with edges that are downstream from the previous current nodes transitively, can be referred to now as dead branches as discussed above. For example, referring to FIG. 4, if 100 ms have elapsed since arrival at node/vertex/ service 'c', then it can be inferred that the edge c-to-d will not be followed, since the average traversal time for that c-to-d edge is 30 ms, so if the process was going to traverse the c-to-d edge the process would have most likely already done so. The traversal probabilities from the vertex at the upstream end of the dead edge (vertex 'c' in the example just given) can then be recomputed to take account of the inference that the traversal probability for the edge c-to-d is now zero. That is, an edge is dead during execution of the application, since that edge was not traversed by an event within an amount of time that is significantly greater than the expected traversal time of the dead edge; e.g., within a certain multiple of the expected traversal time of the dead edge. The threshold (i.e., a certain multiple) can be set for example at one-and-a-half, twice, three-times or some other multiple (e.g., 45 ms, 60 ms, 90 ms or some other value in the specific example from FIG. 4 with an expected traversal time of 30 ms). This time is of course referenced to the amount of time that has elapsed after process flow arrived at the edge's upstream end (i.e., vertex c in this example). Once an edge is deemed to be dead, all the affected edges can have their traversal probabilities recomputed. Referring back again to the example in FIG. 4, the traversal probability for edge d-to-e for the current workflow instance is now zero, and the traversal probabilities for edges c-to-f and c-to-g are now proportionally increased respectively from 60/100 to 60/80 (i.e., 75%) and from 18/100 to 18/80 (i.e., 22.5%). Moreover, if service_d had been pre-started, the recognition that edge c-to-d will not be followed allows a decision to be made that service_d should be closed down again.

In Step S53, the service management program associates an expected traversal time with each event. Similar to the traversal probabilities probabilities, these expected traversal times may be given no initial values, or some initial values based on values taken from a previous instance or analysis of the application. The initial values are then refined to sensible values empirically through the loop of monitoring and continual revising.

In Step S54, the service management program determines a required pre-start time for each service, which is an amount of time taken by the service from receiving a service call to becoming ready to process an action.

In Step S55, the service management program determines a pre-start payoff time for each service, which is a time difference between a processing time for an action when the service is already running and available at the time the event occurs, and a processing time for an action when the service is not running and is first started by the event. Continual revision of the pre-start payoff time can take place for each service, based on monitoring at least one of required start-up times for that service and processing times for actions on that service.

In Step S56, the service management program monitors traversal of the directed graph during execution of an application.

In Step S57, the service management program applies decision logic during execution of the application to decide whether to pre-start services that may still be called, where a pre-start is a start that takes place prior to occurrence of an event calling that service. Optionally also, the decision logic may be used to decide whether to close services that are currently running, based on whether the services may still be called. The decision logic takes account at least of the traversal probabilities, but may also take account of the required pre-start times and/or the pre-start pay-off times.

In Step S58, the service management program starts the services selected for pre-starting by the decision logic. A service which the decision logic has decided to pre-start is started at a time that is ahead of the service's predicted call by a time interval based on the required pre-start time. Even if the decision logic decides that a certain service should be re-started, system conditions may override this decision; for example if there are no available server slots for a pre-emptive running of a service, or there is currently some kind of overloading affecting performance. A measure to improve execution efficiency is to associate a pre-start marker, which stores the required pre-start time for a particular service, with another service (i.e., a different vertex in the directed graph), namely another service that lies upstream of the service to be pre-started by at least one edge. In this way, the information on the pre-start timings resides in the vertex where the process flow currently resides for ease of reference.

A concrete example is now described using OpenWhisk terminology in which an 'action' is the running of a service and an 'event' is something that triggers a service to be run. Examples of possible calling 'actors' can be: (i) a service running locally, (ii) a remote application, (iii) a session in a user's browser, or (iv) a device on the 'internet of things'. Associated with an actor's server-visible events is a particular action that it is performing which may for example be: (i) a particular step in a local or remote flow, such as the processing of a particular REST call, (ii) a particular webpage appealing in a user's browser session, (iii) a particular outgoing call from a device, or (iv) a particular 'trigger' fired from a filter on the data coming from a device.

An action that is sent to a particular server creates an event in the receiving server that has an associated time—the 'event time.' The server will respond to an event by running a particular action. A service is made ready to run the action and the time this is commenced is called the 'service start time'. The 'action start time' is the time that the server will start processing the application's action. It is noted that the application start time occurs after completion of the preparatory work the system needs to do to enable the application code to run. An event is processed by a particular service that occupies a particular service slot. When a service is started, the service is bound to and occupies a service slot. 'Service-initialization-time' is the time it takes between service start commencing and the time that the service can commence processing of an application action. The following mappings are held:

'event' to 'event-type': fn(event)->event-type.
'event-type' to (local) 'action': fn(event-type)->action.
'action' to required 'service': fn(action)->service.

Having established the terminology, the method that learns, maps and predicts the event-action flows is described as follows:

1. The system awaits the arrival of an event.
2. The name for the action that sent the event is derived.
3. An event is formed from the tuple (causing action name, time, event).
4. The time for the causing action to have been initiated is retrieved; e.g, when the webpage that the user just clicked on was sent out, when the microservice that has just made this REST call was started.
5. An example (vertex-edge-vertex) can be formed for the graph for action_A->action_B information and associated timings.
6. The action->action edge in the graph is located and statistical information is updated, namely:
6a The population for 'what happens after action_A' can be updated thereby adjusting the percentage probabilities of 'next' actions after action_A.
6b The time between action_A and the call to action_B is added to that population of times seen and thus contributes to the statistical summary (average call-out fuse for action_ A->action_B).
7. For this particular user HTTP session or application flow:
7a The 'current' position of the statistical graph is updated to arrive at the new node 'action_B'.
7b The 'pre-start service' information for node 'action_B' is examined to determine which services (other than 'action_B') may benefit from being pre-started, and if there are services that are likely to benefit from being pre-started then these services are passed to the service pre-start flow described below.

8. The system looks to see if there is a pre-started instance of service that executes action_B running:

8a if 'yes', then the CPU with the least current usage is passed the new incoming event to process and the value for the CPU and the time since the service was started is sent to the service pre-start process.

8b if 'no', then a copy of the service for action_B is started and passed to the incoming event to process.

The pre-start service is initiated from step 7 above and will receive over time a population of information events that include data on which service needs to be started and which node in step 7 above is triggering this pre-start service. It is noted that the node may not directly call the service that the start is being requested for, since, for example, the service may be two of more steps, or hops upstream in the application flow graph. Additionally the time gap between the service being started and the event that needs the service arriving is also recorded, as well as optionally also the associated CPU utilization percentage of the service's server at the instant the service's server receives the application event.

For tuning the system, this example adopts an approach for optimizing the node-specific pre-start time of a type according to the 'first way' described further above. Namely, for a particular service, over time, the pre-start service slowly adjusts the required 'service-initialization time' upwards, which will cause the markers for pre-starting of this service to slowly move 'upstream' in the graph of likely event flows and thus trigger this service's pre-start to creep earlier and earlier in the flow. As mentioned above when discussing Step S58, using the directed graph in this approach to store the pre-start data is a good solution, since, by pushing a pre-start marker upstream from a node with two (or multiple) incoming edges, the marker will automatically be duplicated (or replicated) so that the marker will become associated with both (or all) upstream services that can lead to that node.

This pushing a pre-start marker upstream is done until the initialization work done by the server (which can be done prior to the application event) begins to be resolvable from the application processing work as discussed further above with reference to FIG. 3; i.e., the server is started and ready prior to the application event arriving, which causes the server's CPU utilization to drop prior to the 'real' work arriving and, in step 8a above, stops further increases being made to that server's service initialization time. Alternatively, an approach of a type according to the 'second way' described further above could be taken.

It is noted that service pre-start markers are associated with the node upstream of the actual ideal time for a service pre-start. For example, if a service 'g' benefits from a 3 second service-initialization time, but the previous node 'f' takes typically 5 seconds before 'g' is called, then the pre-start marker will be stored associated with node 'f', but has an associated 2 second delay (i.e., 5 minus 3). The system will thus wait for 2 seconds after event 'f' occurs before pre-starting service 'g'. Additionally, it is noted that performing a pre-start may additionally be conditional on other factors such as whether there is a spare server slot available, and whether using that server slot for a pre-start is deemed to be the best use of the server slot.

If the system requires starting a service for an actual arriving event and there are no available server resource slots, then the pool of pre-started servers that are not currently doing application event work can be analyzed. Since the system can now determine both the quantified benefit of pre-starting a particular service (and thus the process cost of closing the service unused) and the statistical likelihood of a pre-started service being used based on the currently active workflows (e.g., browser sessions), the population of pre-started servers can be optimally picked over, culled and occasionally removed.

In the above method, statistics are compiled and tracked for a particular (micro)service 'a', 'b', 'c' etc. However, as an extension to the above method, it can be envisaged how this population could be split into finer-grained, smaller populations such as: service 'b' when called from service 'a' (which could be denoted service_ab), which would be different from how service 'b' behaves when service b is called from another service such as service 'f', and so on.

Although embodiments of the present invention have been described principally based on the example of a microservice-based application, as is found in serverless computing, the above-described approach is more generally a graph-based method and system in which lead times required for starting services can be projected upstream in an application flow through the services for one or more 'hops' (i.e., service sequences) and in which the statistical probability for the current traversal of the process flow arriving at a particular service within the next given period of time can be tracked. The probabilities and timings are continually updated with actual events seen and so the system grows in accuracy over time through a learning process. This time and probability prediction, with the learned benefit of additional artificial event injection, are in principal also applicable to other stepped flow environments.

By pre-starting services when there is predicted to be a net benefit in a serverless computing system and optionally also removing pre-started services that are no longer needed as well as deciding to close or keep running other services that are running, one of the drawbacks of cloud provisioning systems is mitigated. Advantages that may be gained in one or more embodiments of the present invention include: allowing continued use of traditional server software environments in a serverless computing environment; enabling faster start times for (micro)services through less waiting, for example for docker image loading; and providing more efficient use of resources by a software-as-a-service provider, such as a cloud service provider.

In summary, the method, apparatus and computer program product of the present invention does not just track the true/false nature of a machine instruction condition, but also tracks multi-link next options and adjusts in an intelligent learning scheme the optimum time gaps for pre-emptive launching of microservices. In some embodiments, the preparatory pre-emptive starting of a server for running services is brought forward by more than one hop or edge in the directed graph of predicted service-to-service flows. An analysis of start-up times and combined probabilities is applied to the directed graph in order to make decisions on whether and when to pre-emptively launch microservices and servers on which to run the microservices. The approach may also be extended to manage continuance of currently running microservices, in particular those microservices still in the initialization phase after pre-emptive pre-start, based on how a current application is traversing the directed graph.

Figure 6:
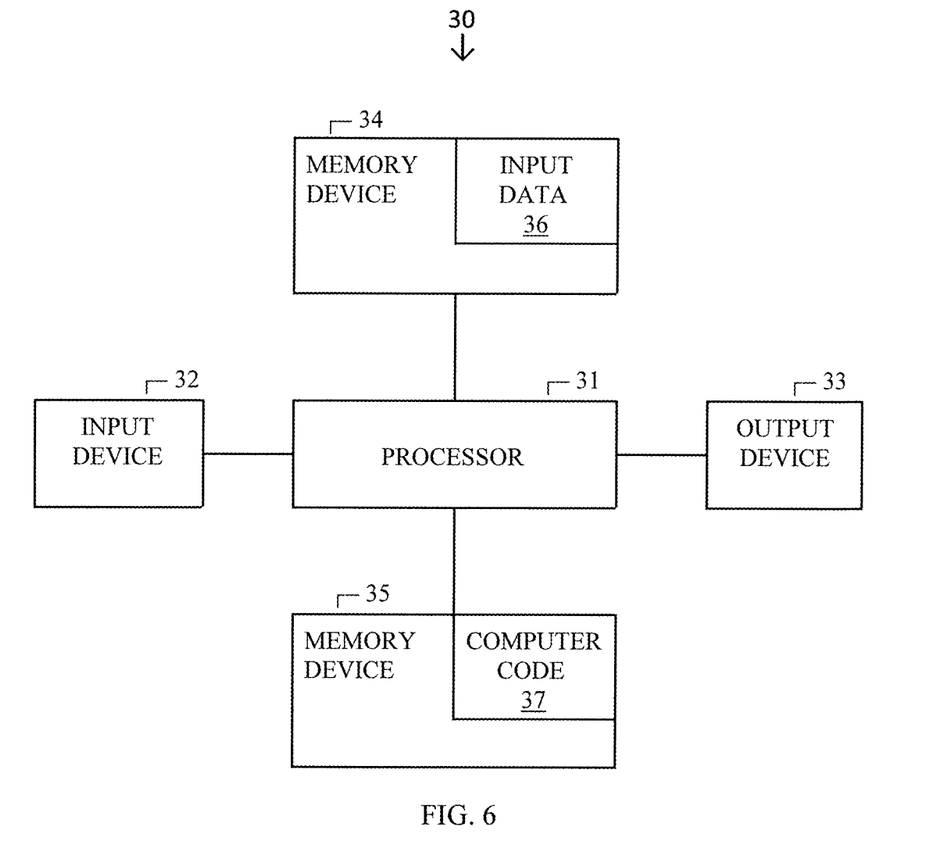
FIG. 6 illustrates a computer system used for implementing the methods of the present invention.

FIG. 6 illustrates a computer system 30 used for implementing the methods of the present invention. The computer system 30 comprises a processor 31, an input device 32 coupled to the processor 31, an output device 33 coupled to the processor 31, and memory devices 34 and 35 each coupled to the processor 31. The input device 32 may be, inter alia, a keyboard, a mouse, etc. The output device 33 may be, inter alia, a printer, a plotter, a computer screen, a magnetic tape, a removable hard disk, a floppy disk, etc. The memory devices 34 and 35 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 35 includes a computer code 37 which is a computer program that comprises computer-executable instructions. The computer code 37 includes software or program instructions that may implement an algorithm for implementing methods of the present invention. The processor 31 executes the computer code 37. The memory device 34 includes input data 36. The input data 36 includes input required by e computer code 37. The output device 33 displays output from the computer code 37. Either or both memory devices 34 and 35 (or one or more additional memory devices not shown in FIG. 6) may be used as a computer usable storage medium (or program storage device) having a computer readable program embodied therein and/or having other data stored therein, wherein the computer readable program comprises the computer code 37. Generally, a computer program product (or, alternatively, an article of manufacture) of the computer system 30 may comprise said computer usable storage medium (or said program storage device).

The processor 31 may represent one or more processors. The memory device 34 and/or the memory device 35 may represent one or more computer readable hardware storage devices and/or one or more memories.

Thus the present invention discloses a process for supporting, deploying and/or integrating computer infrastructure, integrating, hosting, maintaining, and deploying computer-readable code into the computer system 30, wherein the code in combination with the computer system 30 is capable of implementing the methods of the present invention.

While FIG. 6 shows the computer system 30 as a particular configuration of hardware and software, any configuration of hardware and software, as would be known to a person of ordinary skill in the art, may be utilized for the purposes stated supra in conjunction with the particular computer system 30 of FIG. 6. For example, the memory devices 34 and 35 may be portions of a single memory device rather than separate memory devices.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises one or more computer readable hardware storage devices having computer readable program code stored therein, said program code containing instructions executable by one or more processors to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method for which a service call is referred to as an event and processing the service call is referred to as an action, said method comprising:

monitoring, by one or more processors of a computer system, traversal of a directed graph for an application during an execution of the application, said directed graph having vertices representing services and edges representing events, said directed graph providing a map of process flow of the application;

continually revising, by the one or more processors, traversal probabilities for events in the directed graph which may still occur during the execution of the application;

applying, by the one or more processors, decision logic during the execution of the application to decide whether to pre-start one service in the directed graph that may still be called prior to an event in the directed graph calling the one service; and pre-starting, by the one or more processors, the one service decided upon by the decision logic.

2. The method of claim 1, said method further comprising:
additionally applying, by the one or more processors, the decision logic to decide whether to close existing services in the directed graph that are currently running, based on whether the existing services may still be called.

3. The method of claim 1, wherein the decision logic takes account of the traversal probabilitiy associated with each event in the directed graph.

4. The method of claim 1, said method further comprising:
determining, by the one or more processors, a required pre-start time for each service in the directed graph, said required pre-start time for each service in the directed graph being an amount of time taken by each service in the directed graph from receiving a service call to becoming ready to process an action that processes the service call; and starting, by the one or more processors, a first service in the directed graph which the decision logic has decided to pre-start at a time that is ahead of the first service's predicted call time by a time interval based on the required pre-start time.

5. The method of claim 4, said method further comprising:
associating, by the one or more processors, pre-start markers which store the required pre-start times with vertices lying at least one edge upstream of the services in the directed graph to be pre-started.

6. The method of claim 4, said method further comprising:
continually revising, by the one or more processors, the required pre-start time for each service in the directed graph based on monitoring processing times for actions that process each service in the directed graph.

7. The method of claim 1, said method further comprising:
determining, by the one or more processors, a pre-start payoff time for each service in the directed graph, said pre-start payoff time for each service in the directed graph being a time difference between a processing time for an action when each service in the directed graph is already running and available at the time an event in the directed graph occurs, and a processing time for an action when each service in the directed graph is not running and is first started by the event in the directed graph, wherein the decision logic decides on whether to pre-start each service in the directed graph taking account of the pre-start payoff time for each service in the directed graph.

8. The method of claim 7, said method further comprising:
continually revising, by the one or more processors, the pre-start payoff time for each service in the directed graph based on monitoring at least one of required start-up times for each service in the directed graph and processing times for actions on each service in the directed graph.

9. The method of claim 1, said method further comprising:
associating, by the one or more processors, an expected traversal time with each event in the directed graph;
deeming, by the one or more processors, an edge to be dead during execution of an application if the edge deemed to be dead is:
either not traversed by an event in the directed graph after an amount of time has elapsed after process flow has arrived at the vertex located at the edge's upstream end, wherein the amount of time is significantly greater than the expected traversal time; or
an alternative edge emanating from the vertex is traversed; and,
in response to an edge having been deemed to be dead, revising, by the one or more processors, the traversal probabilities for edges lying downstream of the vertex at the upstream end of the dead edge to take account of non-traversal of the dead edge.

10. A computer program product, comprising one or more computer readable hardware storage devices having computer readable program code stored therein, said program code containing instructions executable by one or more processors of a computer system to implement a method for which a service call is referred to as an event and processing the service call is referred to as an action, said method comprising:
monitoring, by the one or more processors, traversal of a directed graph for an application during an execution of the application, said directed graph having vertices representing services and edges representing events, said directed graph providing a map of process flow of the application;
continually revising, by the one or more processors, traversal probabilities for events in the directed graph which may still occur during the execution of the application;
applying, by the one or more processors, decision logic during the execution of the application to decide whether to pre-start one service in the directed graph that may still be called prior to an event in the directed graph calling the one service; and
pre-starting, by the one or more processors, the one service decided upon by the decision logic.

11. The computer program product of claim 10, said method further comprising:
additionally applying, by the one or more processors, the decision logic to decide whether to close existing services in the directed graph that are currently running, based on whether the existing services may still be called.

12. The computer program product of claim 10, wherein the decision logic takes account of the traversal probabilitiy associated with each event in the directed graph.

13. The computer program product of claim 10, said method further comprising:
determining, by the one or more processors, a required pre-start time for each service in the directed graph, said required pre-start time for each service in the directed graph being an amount of time taken by each service in the directed graph from receiving a service call to becoming ready to process an action that processes the service call; and
starting, by the one or more processors, a first service in the directed graph which the decision logic has decided to pre-start at a time that is ahead of the first service's predicted call time by a time interval based on the required pre-start time.

14. The computer program product of claim 13, said method further comprising:
associating, by the one or more processors, pre-start markers which store the required pre-start times with vertices lying at least one edge upstream of the services in the directed graph to be pre-started.

15. The computer program product of claim 13, said method further comprising:
continually revising, by the one or more processors, the required pre-start time for each service in the directed graph based on monitoring processing times for actions that process each service in the directed graph.

16. A computer system, comprising one or more processors, one or more memories, and one or more computer readable hardware storage devices, said one or more hardware storage device containing program code executable by the one or more processors via the one or more memories to implement a method for which a service call is referred to as an event and processing the service call is referred to as an action, said method comprising:
monitoring, by the one or more processors, traversal of a directed graph for an application during an execution of the application, said directed graph having vertices representing services and edges representing events, said directed graph providing a map of process flow of the application;
continually revising, by the one or more processors, traversal probabilities for events in the directed graph which may still occur during the execution of the application;
applying, by the one or more processors, decision logic during the execution of the application to decide whether to pre-start one service in the directed graph that may still be called prior to an event in the directed graph calling the one service; and
pre-starting, by the one or more processors, the one service decided upon by the decision logic.

17. The computer system of claim 16, said method further comprising:
additionally applying, by the one or more processors, the decision logic to decide whether to close existing services in the directed graph that are currently running, based on whether the existing services may still be called.

18. The computer system of claim 16, wherein the decision logic takes account of the traversal probabilitiy associated with each event in the directed graph.

19. The computer system of claim 16, said method further comprising:
determining, by the one or more processors, a required pre-start time for each service in the directed graph, said required pre-start time for each service in the directed graph being an amount of time taken by each service in the directed graph from receiving a service call to becoming ready to process an action that processes the service call; and starting, by the one or more processors, a first service in the directed graph which the decision logic has decided to pre-start at a time that is ahead of the first service's predicted call time by a time interval based on the required pre-start time.

20. The computer system of claim 19, said method further comprising:

associating, by the one or more processors, pre-start markers which store the required pre-start times with vertices lying at least one edge upstream of the services in the directed graph to be pre-started.

* * * * *